(12) United States Patent
Rudolf et al.

(10) Patent No.: US 8,542,613 B2
(45) Date of Patent: Sep. 24, 2013

(54) HIGH-THROUGHPUT CHANNEL OPERATION IN A MESH WIRELESS LOCAL AREA NETWORK

(75) Inventors: Marian Rudolf, Montreal (CA); Juan Carlos Zuniga, Montreal (CA); Joseph S. Levy, Merrick, NY (US); Sudheer A. Grandhi, Mamaroneck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 417 days.

(21) Appl. No.: 11/740,018

(22) Filed: Apr. 25, 2007

(65) Prior Publication Data
US 2007/0248104 A1 Oct. 25, 2007

Related U.S. Application Data

(60) Provisional application No. 60/794,604, filed on Apr. 25, 2006.

(51) Int. Cl.
*H04L 12/28* (2006.01)
*H04W 84/18* (2009.01)

(52) U.S. Cl.
CPC .................... *H04W 84/18* (2013.01)
USPC ........... 370/255; 370/254; 370/312; 370/406; 370/432

(58) Field of Classification Search
None
See application file for complete search history.

(56) References Cited

U.S. PATENT DOCUMENTS

| | | | |
|---|---|---|---|
| 6,615,038 B1 * | 9/2003 | Moles et al. | 455/418 |
| 6,947,963 B1 * | 9/2005 | Agarwal et al. | 709/201 |
| 7,430,195 B2 | 9/2008 | Utsunomiya et al. | |
| 7,698,550 B2 | 4/2010 | Abhishek et al. | |
| 7,738,374 B2 | 6/2010 | Yagyu et al. | |
| 2002/0174175 A1 * | 11/2002 | Zhu et al. | 709/203 |
| 2003/0120766 A1 * | 6/2003 | Ishiyama et al. | 709/223 |
| 2003/0129966 A1 * | 7/2003 | Le Bars et al. | 455/411 |
| 2003/0129983 A1 * | 7/2003 | Bars | 455/445 |
| 2003/0163555 A1 * | 8/2003 | Battou et al. | 709/223 |
| 2003/0184433 A1 * | 10/2003 | Zalitzky et al. | 340/310.06 |
| 2003/0206192 A1 * | 11/2003 | Chen et al. | 345/733 |

(Continued)

FOREIGN PATENT DOCUMENTS

| WO | 03/019966 | 3/2003 |
|---|---|---|
| WO | 2005/011203 | 2/2005 |

(Continued)

OTHER PUBLICATIONS

WO 2005/122501 A1. Dalmases et al. "Wireless Communication System, Wireless Communication Device for Use as a Station in a Wireless Communication System, A Method of Communication Within a Wireless Commltnication System." Published Dec. 22, 2005. Koninklijke Philips Electronics N.V.*

(Continued)

*Primary Examiner* — Ayaz Sheikh
*Assistant Examiner* — Peter Chau
(74) *Attorney, Agent, or Firm* — Volpe and Koenig, P.C.

(57) ABSTRACT

High throughput channel operation in a mesh wireless local area network (WLAN) is disclosed. A mesh network comprises a plurality of mesh points and a network management entity (NME). The NME is configured to retrieve capability and configuration data from the mesh points. The NME configures at least one mesh point with respect to IEEE 802.11n channelization and legacy protection mode based on the capability and configuration data.

21 Claims, 1 Drawing Sheet

(56) References Cited

U.S. PATENT DOCUMENTS

| | | | | |
|---|---|---|---|---|
| 2003/0235175 | A1* | 12/2003 | Naghian et al. | 370/338 |
| 2005/0111403 | A1* | 5/2005 | Rudolf et al. | 370/328 |
| 2005/0143110 | A1* | 6/2005 | Stephens | 455/509 |
| 2005/0181728 | A1 | 8/2005 | Hansen et al. | |
| 2005/0282494 | A1 | 12/2005 | Kossi et al. | |
| 2006/0018303 | A1* | 1/2006 | Sugiarto et al. | 370/352 |
| 2006/0023682 | A1* | 2/2006 | Tamura | 370/338 |
| 2006/0089148 | A1* | 4/2006 | Zhao et al. | 455/447 |
| 2006/0146869 | A1* | 7/2006 | Zhang et al. | 370/465 |
| 2006/0159003 | A1* | 7/2006 | Nanda et al. | 370/203 |
| 2006/0182017 | A1* | 8/2006 | Hansen et al. | 370/208 |
| 2006/0193284 | A1* | 8/2006 | Stieglitz et al. | 370/328 |
| 2006/0221940 | A1* | 10/2006 | Ong et al. | 370/352 |
| 2006/0291432 | A1* | 12/2006 | Xhafa et al. | 370/336 |
| 2007/0109989 | A1 | 5/2007 | Nakagawa et al. | |
| 2007/0110197 | A1* | 5/2007 | Bagchi et al. | 375/349 |
| 2007/0133490 | A1* | 6/2007 | Kwon | 370/338 |
| 2007/0160040 | A1* | 7/2007 | Kwon | 370/389 |
| 2007/0173248 | A1* | 7/2007 | Sekhar | 455/423 |
| 2007/0195744 | A1* | 8/2007 | Solomon et al. | 370/338 |
| 2007/0206547 | A1* | 9/2007 | Gong et al. | 370/338 |
| 2007/0207823 | A1* | 9/2007 | van Nee et al. | 455/509 |

FOREIGN PATENT DOCUMENTS

| | | |
|---|---|---|
| WO | 2005/122501 | 12/2005 |
| WO | 2006/016746 | 2/2006 |
| WO | 2006/031445 | 3/2006 |

OTHER PUBLICATIONS

WO 2005/122501 A1. Dalmases et al. "Wireless Communication System, Wireless Communication Device for Use as a Station in a Wireless Communication System, A Method of Communication Within a Wireless Communication System." Published Dec. 22, 2005. Koninkijke Philips Electronics V.V.*

IEEE, *IEEE P802.11n/D2.00 Draft Amendment to Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment<Number>: Enhancements for Higher Throughput*, (Feb. 2007).

ETSI, *Electromagnetic compatibility and Radio spectrum Matters (ERM); Converged Fixed-Nomadic BWA;System reference document*,ETSI TR XXX XXX V0.5.1 (Jun. 2005).

IEEE, *IEEE P802.11n/D2.00 Draft Standard for Information Technology—Telecommunication and Information Exchange Between Systems—Local and Metropolitan Area Networks—Specific Requirements—Part 11: Wireless LAN Medium Access Control (MAC) and Physical Layer (PHY) Specifications: Amendment<Number>: Enhancements for Higher Throughput*, (Feb. 2007).

IEEE, *IEEE P802.11n/D2.00 Draft Amendment to Standard for Information Technology—Telecommunication and Information Exchange Between Systems—Local and Metropolitan Area Networks—Specific Requirements—Part 11: Wireless LAN Medium Access Control (MAC) and Physical Layer (PHY) Specifications: Amendment<Number>: Enhancements for Higher Throughput*, (Feb. 2007).

ETSI, *Electromagnetic compatibility and Radio spectrum Matters (ERM); Converged Fixed-Nomadic BWA; System reference document*, ETSI TR XXX XXX V0.5.1 (Jun. 2005).

Faccin et al., "Mesh WLAN Networks: Concept and System Design," IEEE Wireless Communications, vol. 13, Issue 2 (Apr. 2006).

IEEE, *IEEE P802.11n/D0.04 Draft Amendment to Standard [for] Information Technology—Telecommunications and Information Exchange Between Systems—Local and Metropolitan Networks—Specific Requirements—Part 11: Wireless LAN Medium Access Control (MAC) and Physical Layer (PHY) Specifications: Enhancements for Higher Throughput*, (Mar. 2006).

IEEE, *IEEE P802.11n/D2.00 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment<Number>: Enhancements for Higher Throughput*, (Feb. 2007).

IEEE, *IEEE P802.11s/D0.01 Draft Amendment to Standard for Information Technology—Telecommunications and Information Exchange Between systems—LAN/MAN Specific Requirements—Part 11: Wireless Medium Access Control (MAC) and Physical Layer (PHY) Specifications: Amendment: ESS Mesh Networking*, (Mar. 2006).

IEEE, *IEEE P802.11s/D1.00 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment: ESS Mesh Networking*, (Nov. 2006).

IEEE, *IEEE P802.11v/D0.02 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications, Amendment v: Wireless Network Management*, (Mar. 2006).

IEEE, *IEEE P802.11v/D0.05 Draft Amendment to Standard for Information Technology—Telecommunications and Information Exchange Between Systems—LAN/MAN Specific Requirements—Part 11: Wireless Medium Access Control (MAC) and Physical Layer (PHY) Specifications, Amendment v: Wireless Network Management*, (Sep. 2006).

Mujtaba, "TGn Sync Complete Proposal," IEEE 802.11-04/888r8 (Jan. 18, 2005).

Papemmanouil et al., "SemCast: Semantic Multicast for Content-based Data Dissemination," International Conference on Tokyo Data Engineering, pp. 242-253 (Apr. 2005).

* cited by examiner

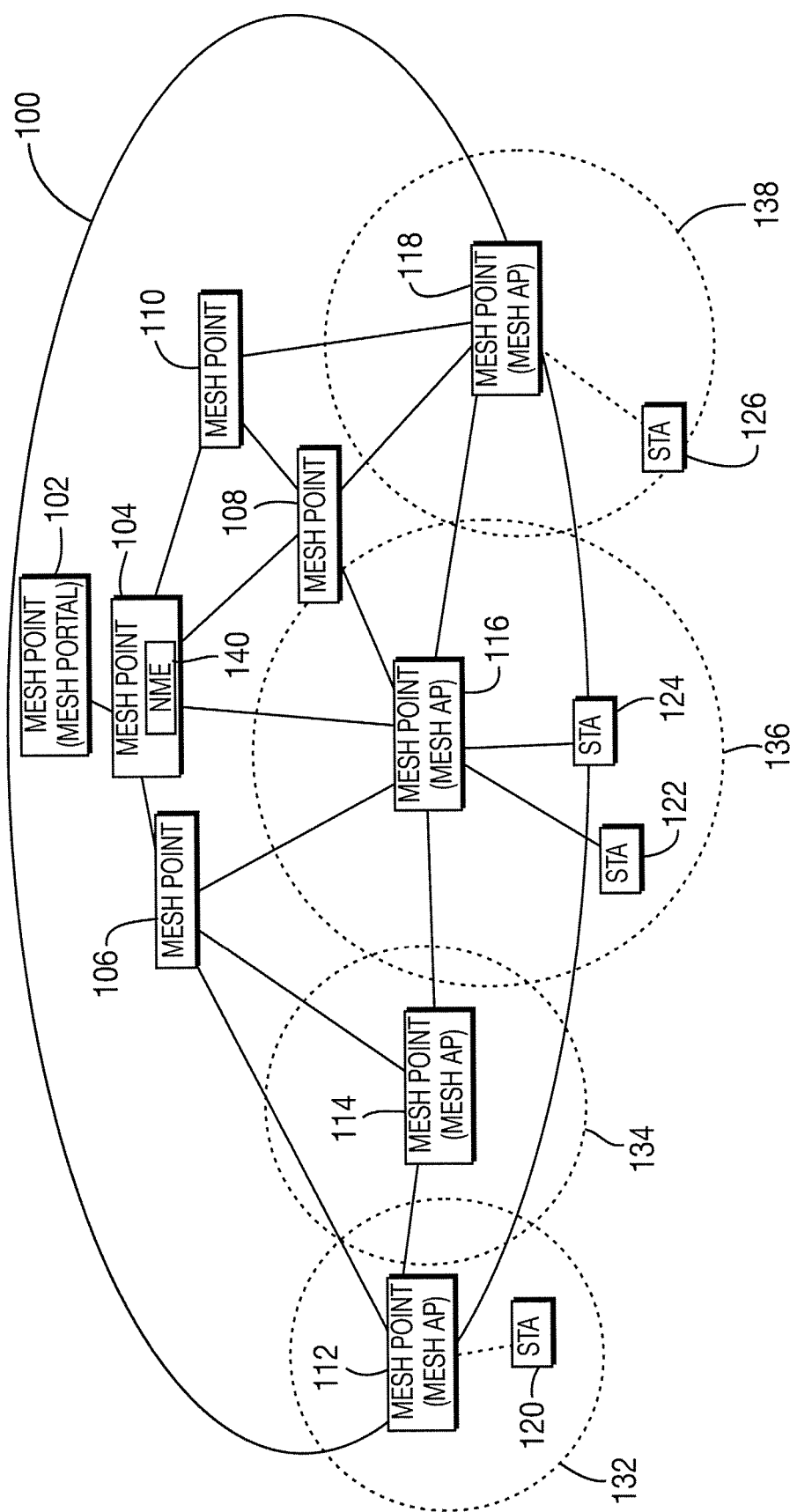

HIGH-THROUGHPUT CHANNEL OPERATION IN A MESH WIRELESS LOCAL AREA NETWORK

CROSS REFERENCE TO RELATED APPLICATION

This application claims the benefit of U.S. Provisional Application No. 60/794,604 filed Apr. 25, 2006, which is incorporated by reference as if fully set forth.

FIELD OF INVENTION

The present invention is related to wireless local area networks (WLANs). More specifically, the present invention is related to high throughput channel operation in a mesh WLAN.

BACKGROUND

IEEE 802.11s is a draft specification for providing a means to form a mesh wireless backhaul with IEEE 802.11 WLAN technology. Mesh networks are also known as multi-hop networks, since data packets may be relayed more than once in order to reach their destination. This presents a different paradigm as compared to the original WLAN standard, which addresses only star topologies for stations (STAs) to be connected to an access point (AP) effectively using single hop communications through a basic service set (BSS).

IEEE 802.11s only addresses network nodes that form a mesh network and the WLAN mesh operation in the backhaul that is transparent to all STAs. This means that, similar to legacy IEEE 802.11 WLAN, STAs still connect to an AP, (i.e., mesh AP having a mesh capability), through a BSS. The mesh AP interfaces on its backhaul side to other mesh points which forward and route traffic through the mesh network to a destination. The destination may be a mesh portal which routes the traffic to the external network or may be another mesh AP attached to the mesh network. By choosing this approach, even legacy STAs may still operate in a mesh-enabled WLAN. The communication between STAs and a mesh AP in a BSS is completely independent from the mesh network. The STAs are unaware of the presence of the mesh network in the backhaul.

The IEEE 802.11s WLAN mesh standard has been designed under the assumption that legacy IEEE 802.11a/b/g radio interface may be implemented on the mesh points. The IEEE 802.11s standard is mostly radio interface agnostic. For example, routing and forwarding of data packets are not dependent on the particularities of an IEEE 802.11a/b/g radio interfaces, (such as modulation scheme or channel coding).

IEEE 802.11s also allows different ways for simultaneous multi-channel operation. One way to implement multi-channel operation is to use multiple IEEE 802.11 radio devices on a mesh point in order to increase the available data throughput capability. Another possibility is to use a single radio device, (so-called common channel framework (CCF)), for more than one channel.

IEEE 802.11n specification is another specification for providing a high throughput (HT) WLAN. Some of the IEEE 802.11n throughput-enhancing features are aggregation, enhanced block acknowledgement (BA), reverse direction grant, power save multiple poll (PSMP), and operational bandwidth. In IEEE 802.11n, a data rate is increased by annexing or bonding two adjacent channels. The data rate increase is also achieved by using several more data tones with 802.11 40 MHz operation relative to 2×20 MHz channel occupancy with 802.11a/g. However, not all IEEE 802.11n devices may support 40 MHz operation and, therefore, the transition of operation from 20 MHz to 40 MHz should be managed efficiently. In order to achieve this, the IEEE 802.11n standard provides some channel management mechanisms.

In IEEE 802.11n, three operating modes are allowed according to bandwidth and BSS capability: 20 MHz operation, 20/40 MHz operation and Phased Coexistence Operation (PCO). Each of these modes has associated rules of operation. In a 20 MHz operation, all STAs will operate only in a 20 MHz mode whether or not the STAs are 20 MHz or 20/40 MHz capable. In a 20/40 MHz operation, STAs choose the bandwidth by using a transmission channel width action message. In addition, a 40 MHz device will protect its transmission with legacy control frames such as request-to-send (RTS) or clear-to-send (CTS) frames, if the AP of its BSS indicates that there are 20 MHz and/or legacy STAs in the BSS. In the PCO mode, which is an optional mechanism, the BSS alternates between 20 MHz and 40 MHz modes.

Although the IEEE 802.11s WLAN mesh standard attempts to remain radio agnostic to the largest extent possible, integration of an IEEE 802.11n high-throughput radio, instead of an 802.11a/b/g, still poses several problems. For example, unlike previous IEEE 802.11a/b/g systems that operate only in 20 MHz bandwidth, IEEE 802.11n operates in both 20 MHz and 40 MHz bandwidths.

With Enhanced Distributed Channel Access (EDCA)-based mesh channel access mode, when a mesh point contends and gets an access to the channel, mesh points on a particular link or in a neighborhood have to agree either before the channel access or during the channel access about the specifics of the channelization scheme to be used, (i.e., 20 MHz vs. 40 MHz). Moreover, IEEE 802.11n uses a slightly altered sub-carrier configuration when using full 40 MHz mode, (i.e., using a higher number of data tones when operating in 40 MHz mode compared to dual channel 2×20 MHz 802.11a radios). Dual 2×20 MHz channel operation is also possible for coexistence with legacy radios. Because current IEEE 802.11s technology only allows orthogonal frequency division multiplexing (OFDM) parameters to be communicated to advertise current channel identification to neighbor MPs, the use of IEEE 802.11n radios in an IEEE 802.11s WLAN mesh networks is severely limited due to the limitation with legacy 20 MHz mode even if an IEEE 802.11n radio is used.

Another problem with the current IEEE 802.11s WLAN mesh networks is the set-up and configuration of a particular mesh link, a neighborhood in the mesh or the entire mesh network with respect to high-throughput channelization modes and configurations to be used. For example, it is currently not possible to prevent or allow the use of 40 MHz access in either version (full 40 MHz or 2×20 MHz) on a particular link, in a mesh neighborhood, or for the entire mesh. This is a limitation with the current IEEE 802.11s technology in the sense that it constitutes an obstacle towards efficient use of 802.11n radios and all the proposed IEEE 802.11n enhancements with WLAN mesh technology.

Therefore, it would be desirable to have a scheme to overcome the above shortcomings and allow efficient integration of IEEE 802.11n radios into IEEE 802.11s WLAN mesh networks.

SUMMARY

The present invention is related to high throughput channel operation in a mesh WLAN. A mesh network comprises a plurality of mesh points and a network management entity (NME). The NME is configured to retrieve capability and configuration data from the mesh points. The NME configures at least one mesh point with respect to IEEE 802.11n channelization and legacy protection mode based on the capability and configuration data.

BRIEF DESCRIPTION OF THE DRAWING

A more detailed understanding of the invention may be had from the following description of a preferred embodiment, given by way of example and to be understood in conjunction with the accompanying drawing wherein:

FIG. 1 is a diagram of a mesh network in accordance with the present invention.

DETAILED DESCRIPTION OF THE PREFERRED EMBODIMENTS

When referred to hereafter, the terminology "STA" includes but is not limited to a wireless transmit/receive unit (WTRU), a user equipment (UE), a fixed or mobile subscriber unit, a pager, a cellular telephone, a personal digital assistant (PDA), a computer, or any other type of user device capable of operating in a wireless environment. When referred to hereafter, the terminology "AP" includes but is not limited to a Node-B, a site controller, a base station, or any other type of interfacing device capable of operating in a wireless environment.

FIG. 1 is a diagram of a mesh network 100 in accordance with the present invention. The mesh network 100 comprises a plurality of mesh points 102-118. The mesh network 100 may include a mesh portal 102. The mesh portal 102 is a mesh point that has a connection with an external network, (e.g., a wired network). Some of the mesh points may be mesh APs 112-118. Each of the mesh APs 112-118 is a mesh point that also works as an AP in its own BSS 132-138. On one side, the mesh AP 112-118 acts as a non-mesh AP to serve STAs 120-126 in its BSS, and on the other side, the mesh AP 112-118 acts as a wireless bridge to receive, forward and route packets through the mesh network 100. An NME 140 is provided to the mesh network 100. The NME 140 may be included in one or more mesh points 102-118 in the mesh network 100. For illustration purposes, FIG. 1 shows only one NME 140 located in mesh point 104. However, the NME may be located in any mesh point 102-118 and more than one NME may be provided to the mesh network 100. Alternatively, the NME 140 may be located out of the mesh network 100 and communicate with the mesh network 100 through the mesh portal 102. Among the mesh points 102-118, at least one mesh point is IEEE 802.11n-capable.

The NME 140 retrieves capability and configuration data from the mesh points 102-118 and configures the mesh points 102-118 with respect to IEEE 802.11n channelization mode, (i.e., 20 MHz, 2×20 MHz, or 40 MHz), legacy protection mode and any other configuration for a particular mesh link, a particular mesh point, a subset of mesh points in the mesh network 100, or the entire mesh network 100. The mesh points 102-118 may be divided into subsets based on a particular link or any other logical criteria. For example, if the NME 140 knows from capability and configuration data from the mesh points 102-118 that there is one or more mesh points that use the legacy physical layer transmission format, (e.g., IEEE 802.11a/b/g), and/or legacy STAs in the mesh network 100 or a subset of the mesh network 100, the NME 140 configures the mesh points in the vicinity of such mesh points and STAs to use legacy physical layer transmission format, (e.g., legacy RTS/CTS frames), to precede any transmissions from IEEE 802.11n-based mesh points. For example, a mesh point using a 40 MHz bandwidth, (i.e., an MP using IEEE 802.11n physical layer transmission format), will protect its transmission with legacy control frames, such as request-to-send (RTS) or clear-to-send (CTS) frames.

Exemplary capability and configuration data that may be retrieved by the NME 140 is shown in Table 1. The NME 140 configures the mesh points 102-118 such that either the mesh network 100 is coherent and similar capabilities are supported across the whole mesh network 100 to support the minimum common parameter, or at least peer mesh points in a particular wireless link are configured coherently.

TABLE 1

| 802.11n Enhancements | Required Level of Support |
| --- | --- |
| Physical (PHY) level spoofing | Mandatory. The length field of the legacy signal (L-SIG) field of a mixed mode packet shall have a value equivalent to the duration of the current physical level convergence procedure protocol data unit (PPDU) when L-SIG transmission opportunity (TXOP) protection is not used. |
| Mechanisms to manage coexistence of 20 and 40 MHz channels. | Mandatory Both transmitter and receiver shall support |
| Channel management and selection methods. | Mandatory Both transmitter and receiver shall support |
| Reduced Inter-Frame Spacing (RIFS) Protection | Mandatory |
| Green Field Protection | Mandatory |
| Space time block codes (STBC) Control Frames | STBC Control Frames allow stations to associate beyond the non-STBC range. |
| L-SIG TXOP Protection | Optional TXOP protection through L-SIG. |
| PCO (Phased Coexistence Operation) | Optional PCO is an optional BSS mode with alternating 20 MHz phase and 40 MHz phase controlled by PCO AP. A PCO capable STA may associate with the BSS as a PCO STA. |

The capability and configuration data of the mesh points 102-118 may be stored in a data base in a mesh point 102-118, or in the NME 140. Alternatively, the database may reside outside the mesh network 100.

The NME 140 may request the capability and configuration data from the mesh points 102-118 during the association process, or shortly after the mesh point 102-118 undergoes an association process with the mesh network 100. The retrieval of the capability and configuration data may be a part of the association process, or may be performed separately. The mesh points 102-118 may send the capability and configuration data in response to a request from the NME 140. Alternatively, the mesh points 102-118 may report the capability and configuration data to the NME 140 without solicitation from the NME 140. Polling may be used to trigger the reporting of the capability and configuration data.

The NME 140 configures all or part of the mesh network 100 with respect to IEEE 802.11n channelization mode, (i.e., 20 MHz, 2×20 MHz, or 40 MHz), configuration, and legacy protection mode based on the capability and configuration data collected from the mesh points 102-118. The configuration may be coupled to a timer such that the configuration is valid for only a certain period of time. The timer may be triggered by a certain event, such as detection of a legacy STA. The configuration may be updated periodically. The NME 140 may configure a particular mesh link, a set of mesh links, a subset of mesh points, or the entire mesh network. The current configuration data, (i.e., IEEE 802.11n channelization mode, legacy protection mode, capability support, capability settings, configured conditions, (e.g., timers or events), and the like), of the mesh points 102-118 may be stored in a database, (e.g., management information base (MIB)), on the mesh points 102-118 or the NME 140.

The NME 140 may configure the mesh points 102-118 using a dedicated message exchange. Alternatively, the NME 140 may use multicast or broadcast messages to configure the mesh points 102-118. The signaling for the configuration may be performed using a conventional network signaling protocol at any layer of the protocol processing stack. For example, a simple network management protocol (SNMP) over user datagram protocol (UDP) over Internet Protocol (IP) may be used. Alternatively, layer 2 (L2) signaling frames of either type or IEEE 802.3 or 802.11 type may be used.

IEEE 802.11n capable devices may use the 40 MHz option occupying another 20 MHz channel, (i.e., extension channel). In such case, a channel collision may occur on the extension channel. In order to avoid channel collision, the IEEE 802.11n-capable mesh points may block the extension channel for the 40 MHz operation from their channel map either by statically, semi-dynamically, or dynamically.

For the static configuration, the extension channel is marked as unavailable for IEEE 802.11n-capable mesh points during the start-up configuration. This may be pre-configured, for instance, by the service provider, through a subscriber identity module (SIM)-card-like configuration, or through a software/driver download.

For the semi-dynamic configuration, the extension channel may be marked as unavailable by exchanging specific configuration information, (e.g., management frames, SNMP to MIB, or the like), between the IEEE 802.11n-capable mesh points and other mesh points. The extension channel may be set unavailable when collisions are detected. Collisions may be detected based on collected statistics. By way of example, SNMP and MIB are conventional and associated mechanisms that can be used. This configuration changes may happen when an IEEE 802.11n-capable mesh point joins the mesh network. Alternatively, the allowed, disallowed, or recommended channel or channel width configuration, legacy protection mode may be communicated between the mesh points during the association process.

For the dynamic configuration, the extension channel may be blocked in real-time and for a limited time, (e.g., channel coordination window, or a specific period), by exchanging control or management frames. For example, a mesh point wishing to use the extension channel may send a control frame marking the extension channel as used for the current period.

A mesh point wishing to block the extension channel from being used by the IEEE 802.11n-capable mesh points may send control or management frames to other mesh points, (for example, when a collision is detected on the extension channel). For this purpose, a new control frame may be defined to declare collision in the extension channel. Alternatively, a conventional congestion control message may be used for this purpose.

Similarly and for both the CCF and the EDCA-based mesh access modes, mesh points may communicate through L2 messages their intention to use 20 MHz, 2×20 MHz, or 40 MHz operation to neighboring mesh points, a subset of the mesh points in the mesh network, or the entire mesh network that they intend to use a particular channel configuration, legacy protection mode during the upcoming TXOP, channel access window, or allocated channel access time.

The L2 messages may be unicast, multicast or broadcast messages. The message may be management frames, control-frames, or any other type of frames. The L2 messages may be used either shortly preceding a channel access attempt, (such as when MRTS/MCTS is used), or be part of signalling frames exchanged during the channel access itself.

Mesh points may periodically send information about anticipated, advertised, or observed channel configuration through L2 messages to one or more neighboring mesh points, a subset of mesh points in the mesh network, or the entire mesh network. For example, a mesh point may inform one or more other mesh points that a particular channel configuration is valid for a particular TXOP, a period of time, or until occurrence of a certain event to another mesh point through the L2 messages.

A mesh point, upon learning channel configuration of a particular neighbor mesh point either through configuration by the NME 140 or from message exchange with other mesh points of the mesh network, establishes a database which maps the mesh points to specific IEEE 802.11n channelization mode, (i.e., 20 MHz, 2×20 MHz, or 40 MHz), configuration, and legacy protection mode. The mesh point uses this database whenever the mesh point attempts to access a channel to choose an optimum channel and/or bandwidth. The database may also be used to determine routing or forwarding paths through the mesh network.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. An access point (AP) comprising:
   a wireless receiver configured to receive, from each of a plurality of wireless transmit receive units (WTRUs), configuration information, wherein configuration information received from at least one of the plurality of WTRUs includes information regarding coexistence of a 20 MHz channel and a 40 MHz channel, green field protection information, space time block coding (STBC) information, and legacy signal field (L-SIG) transmission opportunity (TXOP) protection information; and
   a wireless transmitter configured to transmit, to at least one of the plurality of WTRUs, instructions for controlling operation of the at least one of the plurality of WTRUs regarding IEEE 802.11n channelization and legacy protection, wherein a content of the instructions for controlling the operation of the at least one of the plurality of WTRUs regarding IEEE 802.11n channelization and legacy protection is based at least on the configuration information from each of the plurality of WTRUs.

2. The AP of claim 1, wherein the configuration information received from at least one of the plurality of WTRUs further includes information regarding at least one of physical layer spoofing, reduced inter-frame spacing (RIFS) protection and phased coexistence operation (PCO).

3. The AP of claim 1, wherein the wireless receiver is further configured to wirelessly receive the configuration information from each of the plurality of WTRUs during or after an association process.

4. The AP of claim 1, wherein the wireless transmitter is further configured to wirelessly transmit a request for configuration information to at least one of the plurality of WTRUs;
   and the wireless receiver is further configured to wirelessly receive the configuration information in response to the request.

5. The AP of claim 1, wherein the wireless receiver is configured to wirelessly receive periodic updates of the configuration information from each of the plurality of WTRUs and the wireless transmitter is further configured to wirelessly transmit periodic updates of the instructions for controlling operation of the at least one of the plurality of WTRUs to the at least one of the plurality of WTRUs.

6. The AP of claim 1, wherein the wireless transmitter is configured to transmit the instructions for controlling operation of the at least one of the plurality of WTRUs using at least one of a dedicated message exchange, a multicast message, or a simple network management protocol.

7. The AP of claim 1, wherein the AP is configured to receive a software/driver download comprising extension channel configuration data.

8. The AP of claim 1, wherein the instructions for controlling the operation of the at least one of the plurality of WTRUs comprises extension channel block command information, and the wireless transmitter is configured to wirelessly transmit the extension channel block command information during an association process.

9. The AP of claim 8, wherein the wireless transmitter is configured to wirelessly transmit a congestion control message, wherein the congestion control message includes the extension channel block command information.

10. The AP of claim 1, wherein the configuration information received from at least one of the plurality of WTRUs includes information regarding mechanisms to manage channel management and channel selection methods.

11. The AP of claim 1, wherein the wireless receiver and the wireless transmitter are configured to operate at a channel bandwidth of 20 MHz or 40 MHz.

12. A wireless transmit and receive unit (WTRU) comprising:
   a wireless transmitter configured to transmit configuration information, wherein the configuration information includes information regarding coexistence of a 20 MHz channel and a 40 MHz channel, green field protection information, space time block coding (STBC) information, and legacy signal field (L-SIG) transmission opportunity (TXOP) protection information; and
   a wireless receiver configured to receive instructions for controlling operation of the WTRU regarding IEEE 802.11n channelization and legacy protection, wherein a content of the instructions for controlling the operation of the WTRU regarding IEEE 802.11n channelization and legacy protection is based at least on the configuration information.

13. The WTRU of claim 12, wherein the configuration information further includes information regarding at least one of physical layer spoofing, reduced inter-frame spacing (RIFS) protection and phased coexistence operation (PCO).

14. The WTRU of claim 12, wherein the wireless transmitter is further configured to wirelessly transmit the configuration information during or after an association process.

15. The WTRU of claim 12, wherein the wireless receiver is further configured to wirelessly receive a request for the configuration information;
   and the wireless transmitter is further configured to wirelessly transmit the configuration information in response to the request.

16. The WTRU of claim 12, wherein the wireless transmitter is configured to wirelessly transmit periodic updates of the configuration information and the wireless receiver is further configured to wirelessly receive periodic updates of the instructions for controlling operation of the WTRU.

17. The WTRU of claim 12, wherein the wireless receiver is configured to receive the instructions for controlling operation of the WTRU from at least one of a dedicated message exchange, a multicast message, or a simple network management protocol.

18. The WTRU of claim 12, wherein the instructions for controlling the operation of the WTRU comprises extension channel block command information, and the wireless receiver is configured to wirelessly receive the extension channel block command information during an association process.

19. The WTRU of claim 18, wherein the wireless receiver is configured to wirelessly receive a congestion control message, wherein the congestion control message includes the extension channel block command information.

20. The WTRU of claim 12, wherein the configuration information includes information regarding mechanisms to manage channel management and channel selection methods.

21. The WTRU of claim 12, wherein the wireless transmitter and the wireless receiver are configured to operate at a channel bandwidth of 20 MHz or 40 MHz.

* * * * *